(12) United States Patent
Wang et al.

(10) Patent No.: US 10,867,205 B2
(45) Date of Patent: Dec. 15, 2020

(54) INDICATION OF CHARACTERISTIC BASED ON CONDITION

(71) Applicant: Lenovo (Singapore) Pte. Ltd., Singapore (SG)

(72) Inventors: Song Wang, Cary, NC (US); Ming Qian, Cary, NC (US); John Weldon Nicholson, Cary, NC (US); Jian Li, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/653,003

(22) Filed: Jul. 18, 2017

(65) Prior Publication Data
US 2019/0026592 A1   Jan. 24, 2019

(51) Int. Cl.
*G06K 9/62* (2006.01)
*G06K 9/00* (2006.01)

(52) U.S. Cl.
CPC ....... *G06K 9/6201* (2013.01); *G06K 9/00624* (2013.01); *G06K 9/00671* (2013.01)

(58) Field of Classification Search
None
See application file for complete search history.

(56) References Cited

U.S. PATENT DOCUMENTS

| | | | | |
|---|---|---|---|---|
| 10,049,236 | B1 * | 8/2018 | Alkarmi | G06Q 10/08 |
| 2002/0191004 | A1 * | 12/2002 | Ebersole | G09B 19/00 |
| | | | | 345/633 |
| 2005/0081410 | A1 * | 4/2005 | Furem | E02F 9/267 |
| | | | | 37/379 |
| 2012/0265416 | A1 * | 10/2012 | Lu | B60R 1/00 |
| | | | | 701/70 |
| 2016/0006922 | A1 * | 1/2016 | Boudreau | H04N 5/23206 |
| | | | | 348/207.1 |
| 2017/0010609 | A1 * | 1/2017 | High | E01H 5/12 |
| 2017/0193824 | A1 * | 7/2017 | Wu | G08B 5/36 |

\* cited by examiner

*Primary Examiner* — David Perlman
(74) *Attorney, Agent, or Firm* — Ference & Associates LLC

(57) ABSTRACT

One embodiment provides a method comprising: receiving, at an information handling device, object data of at least one object; identifying, using at least one sensor, a characteristic associated with the at least one object, wherein the characteristic is based upon a condition related to the at least one object; and providing an indication of the identified characteristic to a user.

20 Claims, 3 Drawing Sheets

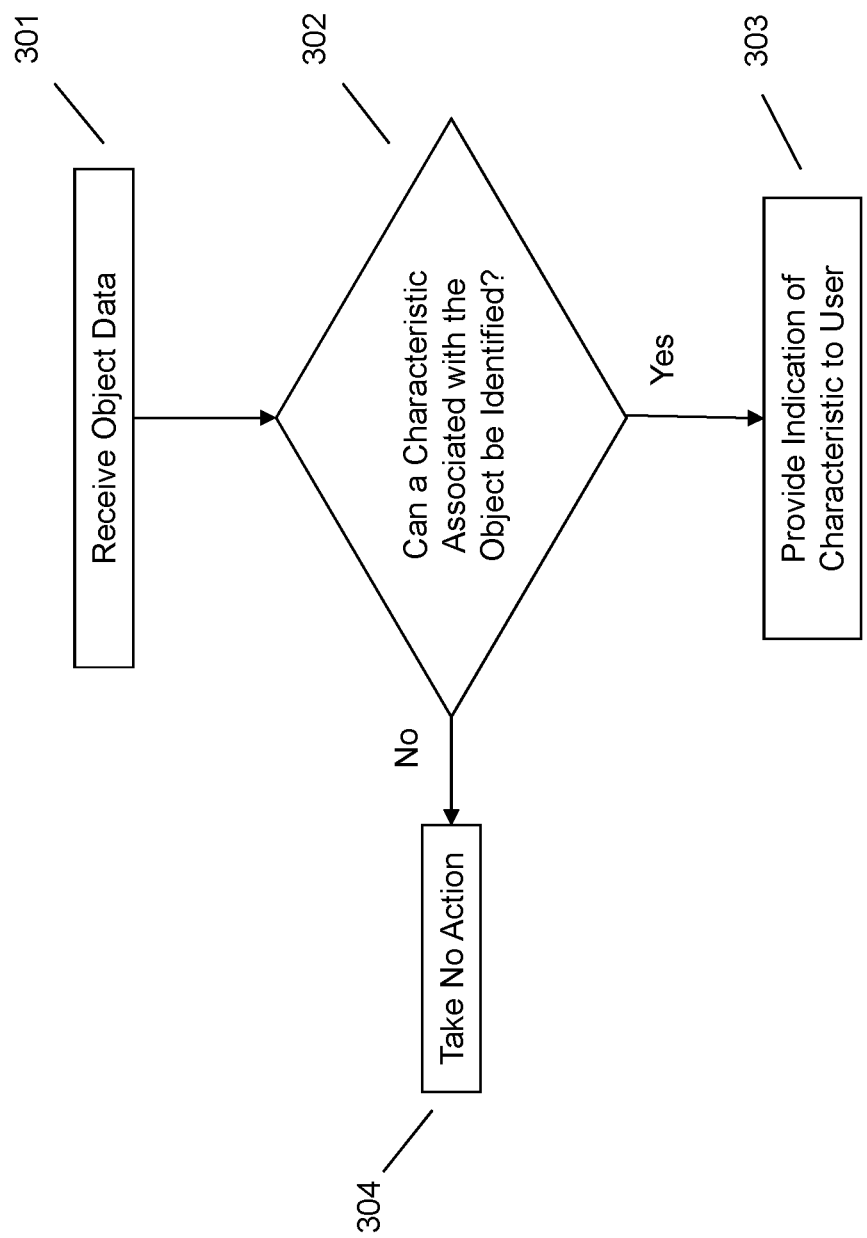

INDICATION OF CHARACTERISTIC BASED ON CONDITION

BACKGROUND

Information handling devices ("devices"), for example smart phones, tablet devices, smart speakers, laptop and personal computers, and the like, may be capable of performing different functions in response to a user request or other input. For example, a user may provide a request to a device, for example, through a voice input module, mechanical input device (e.g., keyboard, mouse, trackpad, etc.), gesture input device, and the like. The device may then process the request and provide an output responsive to the request, for example, an audible output, performing a function associated with the request, updating a display, and the like. One technique that a user may use to interact with a device is through the use of augmented reality ("AR"), virtual reality ("VR"), or other virtual projection techniques. These techniques allow a user to visualize either a virtual or real object and the visualization is augmented with other virtual or real objects.

BRIEF SUMMARY

In summary, one aspect provides a method comprising: receiving, at an information handling device, object data of at least one object; identifying, using at least one sensor, a characteristic associated with the at least one object, wherein the characteristic is based upon a condition related to the at least one object; and providing an indication of the identified characteristic to a user.

Another aspect provides an information handling device, comprising: a processor; at least one sensor operatively coupled to the processor; a memory device that stores instructions executable by the processor to: receive object data of at least one object; identify, using the at least one sensor, a characteristic associated with the at least one object, wherein the characteristic is based upon a condition related to the at least one object; and provide an indication of the identified characteristic to a user.

The further aspect provides a product, comprising: a storage device that stores code, the code being executable by a processor and comprising: code that receives object data of at least one object; code that identifies a characteristic associated with the at least one object, wherein the characteristic is based upon a condition related to the at least one object; and code that provides an indication of the identified characteristic to a user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of providing an indication of a characteristic of an object based on a condition associated with the object.

DETAILED DESCRIPTION

Figure 1:
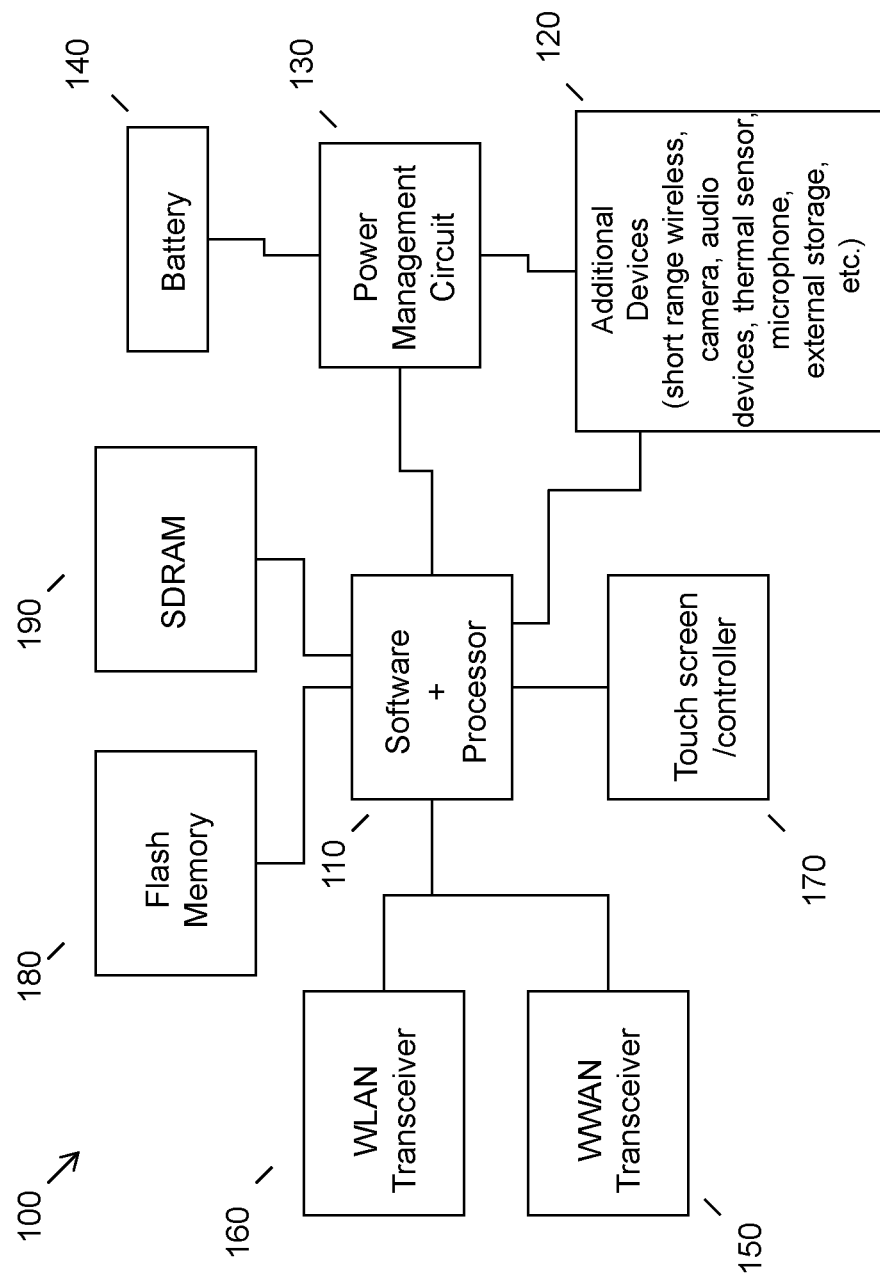
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users interact with various objects during a typical day, for example, information handling devices, clothing, food, drinks, furniture, appliances, and the like. A user typically uses sensory perception to detect characteristics or conditions of the objects. For example, a user may touch a teapot to determine if it is hot or cold. As another example, a user may wear a pair of shoes to determine if the sole is firm or soft. However, using sensory perception can cause, at the least, inconvenience to a user, and, at worst, injuries. Using the shoe example, the user has to put on multiple different shoes to determine which shoe has the desired sole firmness. This process may be very time consuming and inconvenient to the user. Using the teapot example, if the teapot is too hot the user may sustain injuries upon touching the teapot.

In some cases a user may use an information handling device to determine characteristics of the object. For example, an information handling device may include a sensor that can detect or determine a particular characteristic of the object, for example, a thermopile sensor may detect the temperature of an object. As additional examples, the device may include image capture functions, display functions, functions using sensors of the device (e.g., navigation, distance alerts, etc.), and the like. However, these sensors usually have specific functions or are associated with specific applications. In other words, the sensor may have the capability of detecting a particular parameter or characteristic but the sensor only detects the parameter or characteristic for a particular application and cannot be accessed outside of that application. As an example, a navigation application may use sensors to detect the position of the device. However, a user may not be able to access the raw data from the sensor to use the data for a purpose other than the navigation application.

The information handling device may also include additional functionality, for example, a user may have an information handling device with digital assistant software or capabilities. The user may provide a request or query to the digital assistant, which the digital assistant may process and perform a function associated with the request or query. As an example, a user may provide a request to the digital assistant to dim the lights. The digital assistant may then process the request and perform the function of dimming the lights. However, the functionality of the digital assistant and the functionality allowing a user to interact with objects is not a combined function. For example, using conventional techniques a user cannot request that the digital assistant notify the user when an object reaches a particular temperature.

Accordingly, an embodiment provides a method for providing an indication of an identified characteristic to a user. In an embodiment, object data may be received at a device. Example object data may include one or more static or dynamic images of an object, near field communication signals received from an object, radio frequency identification signals received from an object, and the like. The object data may be used by an embodiment to identify the object. For example, each object may include a radio frequency identification (RFID) tag that identifies the object and/or characteristics of the object (e.g., hardness, color, model, type, etc.).

An embodiment may then identify a characteristic associated with the object of interest (e.g., temperature, hardness, velocity, viscosity, etc.). The characteristic may be based upon a condition related to the object. The condition related to the object may include a desired characteristic. For example, if an information handling device can detect multiple different characteristics of the object, the condition may identify the characteristic of interest. The condition may be provided by the user. For example, the user may request an indication of a hardness of an object. As another example, the user may want to be notified when the object reaches a particular condition (e.g., when the object reaches a certain temperature, when the object is considered drinkable, when the object reaches a particular viscosity, etc.).

Responsive to this identification, an embodiment may provide an indication of the characteristic to a user. The indication may include an audible, visual, haptic, or other type of notification. For example, if a user has requested a digital assistant notify the user when an object reaches a particular state, the digital assistant may provide a buzzer or other audible notification when the object reaches the desired state. As another example, an embodiment may provide on a display device an overlay of one image over an image of the object. For example, if a user is using a virtual reality or augmented reality headset, an embodiment may overlay an image of fire over the object seen on the virtual reality or augmented reality headset to illustrate that the object of interest is too hot. Such a method may assist a user in interacting with objects. Additionally, such a method allows an integration of digital assistant software with sensors on an information handling device in order to determine characteristics of objects and a relationship between the characteristic and a desired characteristic.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
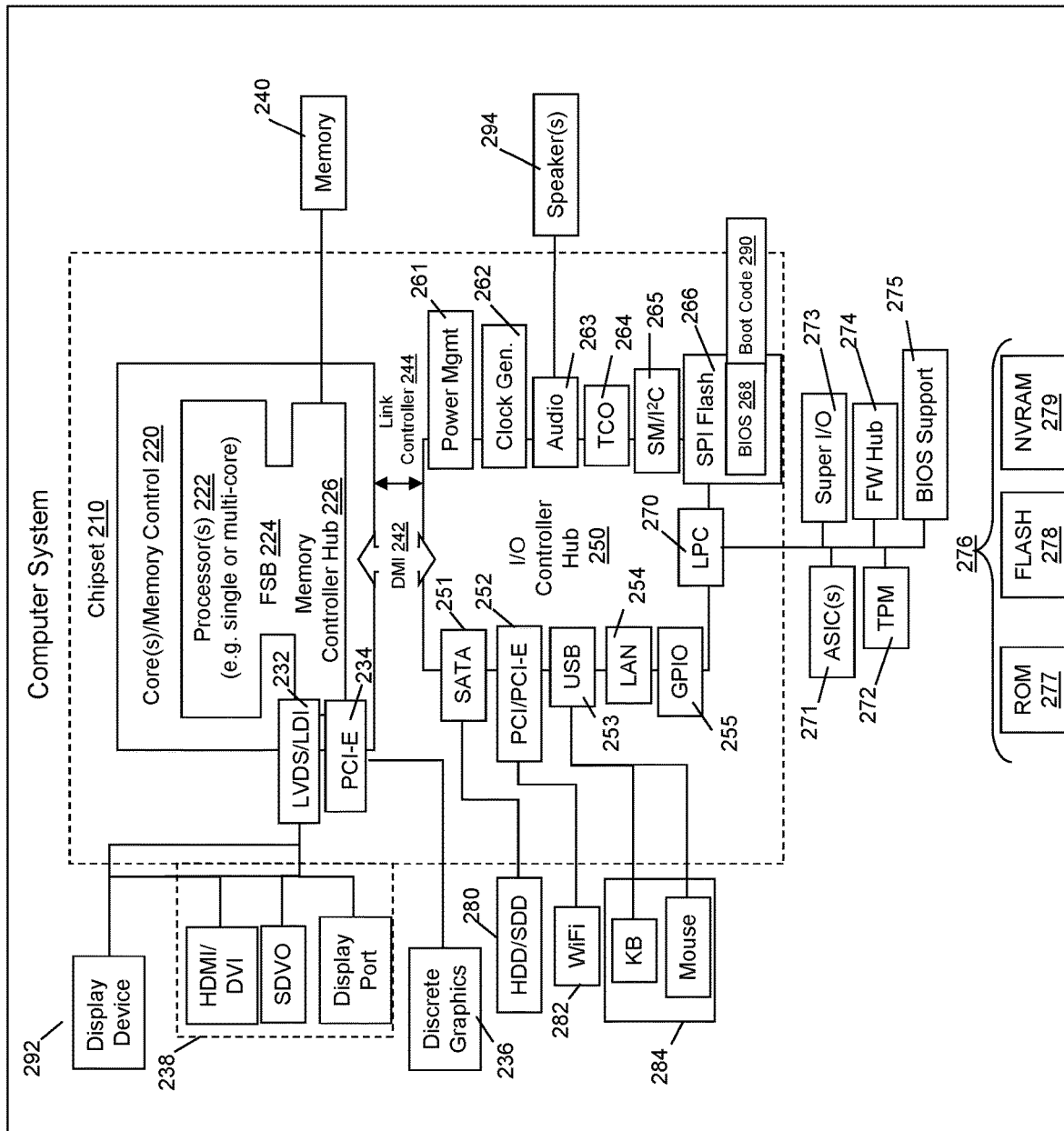
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Referring now to FIG. 3, an embodiment may provide an indication of a characteristic of an object based on a condition associated with the object. At 301, an embodiment may receive object data of at least one object at an information handling device. The information handling device may include any device, for example, a mobile device (e.g., smart phone, tablet, laptop computer, smart watch, etc.), a virtual reality headset, an augmented reality headset, a personal computer, and the like. Receipt of the object data at the information handling device may include capturing the object data with a second information handling device and transmitting the captured object data to the information handling device. For example, a user may use a smart watch to capture the object data and then transmit the object data to a personal computer for further processing.

The object data may include information that assists in identifying the object or identifying a characteristic of the object. Object data may include, for example, an image, radio frequency identification signal, near field communication signal, barcode, audible data, and the like. For example, in one embodiment a user may provide audible input that provides an identification of the object. In one embodiment the object data may include one or more static or dynamic images (e.g., still image, video, display images, barcode, etc.) of one or more objects. For example, a user may use a smart phone to capture an image of an object. The image may include an image of the entire object or may include a barcode or other identification of the object. Additionally, the image may include more than one similar or different object. For example, a user could capture an image having multiple products contained within the image. The one or more images do not have to be captured and stored on the device. Rather, a user may simply use an image capture sensor (e.g., camera, video camera, scanner, etc.) of an information handling device to display an image of the object on the display of the information handling device or a display operatively coupled to the information handling device. As an example, the user may have a virtual reality or augmented reality device that includes a display where the object is displayed on the display but not stored on the device.

In one embodiment the object data may include a signal associated with the object. For example, objects may include one or more radio frequency identification (RFID) or near field communication (NFC) tags which transmit a signal. The information transmitted may include information identifying the object or information distinguishing the object from other objects. For example, the information may include a description of the object and one or more typical characteristics of the object. In one embodiment the information may only include information related to a characteristic of the object. For example, rather than specifically identifying the object, the information may only identify the typical viscosity or hardness of the object.

Once the object data has been received an embodiment may process the object data to identify the object. For example, an embodiment may compare the image data or signal data to a database having stored images or signal data to identify the object or a characteristic of the object. As an example, an embodiment may take a captured image of a barcode and compare it to a database to identify the object and typical characteristics of the object. Typical characteristics may include a typical operating temperature, typical viscosity, typical hardness, and the like. The typical characteristics may identify what the characteristic is when the object is not in use. For example, if a user captures an image of a jug of oil, an embodiment may identify what the viscosity of the oil is when it is not in use. As another example, a user may capture an image having a plurality of shoeboxes. An embodiment may use the information on the shoebox to determine the type of shoes and the sole hardness for each of the shoes.

At 302, an embodiment may determine whether a characteristic associated with the object can be identified. Identification of the characteristic may be completed using one or more sensors or a combination of different sensors. Example sensors may include thermopile sensors, accelerometers, gyroscopes, distance sensors, image sensors, position sensors, radiation sensors, and the like. The identified characteristic may be based upon a condition provided to the system. In one embodiment the condition may be based upon the sensor used to detect and identify the characteristic. For example, if a user is using a radiation sensor an embodiment may determine that level of radiation is the desired condition and thereafter identify the radioactivity of the object. In one embodiment the condition may be based upon a particular application that is being used to capture the characteristic. For example, if a user is using thermometer application, an embodiment may identify that temperature is the desired condition and thereafter identify the temperature of the object.

In one embodiment the condition provided to the system may be provided by a user. For example, a user may provide a request to a virtual assistant requesting the virtual assistant identify the hardness of the object. An embodiment may then identify that the condition is hardness of the object and may thereafter identify the hardness of the object. The condition may also include a desired state of the object. For example, a user may provide a request to a digital assistant that includes an identification of a particular viscosity of oil the user would like. Therefore, an embodiment may identify that the condition is not only the viscosity of the oil but also a specific viscosity. As another example, a user may identify a desired temperature of an object which an embodiment identifies as the condition. An embodiment may then compare the current temperature of the object to the desired temperature.

The condition may be related to a particular user. For example, the user accessing the information handling device may be identified using one or more identification techniques (e.g., biometric data, image data, credentialing, wireless signal data, etc.). An embodiment may access a user profiled associated with the identified user. The user profile may include a history or profile of conditions provided or requested by the user. The history or profile may identify objects encountered by the user and the requested conditions associated with those objects. In other words, based upon the user who has accessed the information handling device, an embodiment may identify conditions usually provided by that user. For example, a particular user may want a particular temperature for food or a particular type of food, while a different user wants a different temperature. Thus, based upon the user an embodiment may identify the desired temperature for that user. Alternatively, the conditions may be crowd-sourced. For example, an embodiment may access a database or data storage location (e.g., cloud storage, network storage, etc.) that contains typical objects and average or typical conditions provided by a plurality of users. An embodiment may then use this average or typical condition as the basis for identification of the characteristic.

If a characteristic of the object cannot be identified at 302, an embodiment may take no further action at 304. If, however, the characteristic of the object can be identified at 302, an embodiment may provide an indication of the characteristic to the user at 303. The indication of the characteristic may include an audible, haptic, visual, or other type of indication or notification. In one embodiment the indication may include a visual indication. The visual indication may include overlaying one image over the image or displayed image of the one or more objects. For example, if an embodiment identifies that a teapot is hotter than the temperature condition provided by the user, the system may overlay an image of fire over the image of the teapot. As another example, if the user is using an augmented reality headset an embodiment may overlay a temperature gradient of an object over the visual of the object, where the temperature gradient image identifies the locations that are hotter or colder than a desired temperature. Other images are possible and contemplated, for example, checkmarks, Xs, highlights, other images, and the like.

The visual indication may also simply include a notification, for example, a pop-up window, text box, or the like. The notification may include an identification of the characteristic. For example, the notification may state "The temperature of this object is 95°." The notification may also include a comparison between the actual characteristic and the desired characteristic. For example, the notification may state "The temperature of this object is 95°. That is 5° cooler than the desired temperature." These are merely examples and should not be construed as limiting in any way. As should be understood by one skilled in the art, the notification can take different forms and state different things.

The indication may also be an audible notification. The audible notification may include a particular sound, for example, a buzzer when a condition is not met and a ding when the condition is met, and the like. The audible notification may also include a recorded voice which provides an indication of the identified characteristic. For example, a digital assistant may provide an output stating the identification of the characteristic. As with the visual notifications other audible notifications are possible and contemplated.

The indication may also provide an identification of an object matching the condition. For example, if the user has provided a desired condition or state of an object, an embodiment may determine which objects out of a plurality of objects match the desired condition or state. As an example, if a user desires a particular shoe sole hardness and the received image includes multiple shoes or shoe boxes, an embodiment may determine which shoes match the desired shoe sole hardness. The system may then provide a notification which identifies those shoes matching the desired sole hardness, for example, by circling the shoes, highlighting the shoes, or the like. An embodiment may also provide an indication of the objects which are close to matching the desired condition. Using the shoe example, if none of the shoes match the desired sole hardness, the system may identify some of the shoes that are close to the desired hardness and indicate that these shoes are a close match.

Similarly, the indication may include an indication that the object is outside a predetermined threshold with respect to the user condition. For example, if the user condition is a particular temperature of a food item, the system may indicate that the food is too hot with respect to the particular temperature of the food item. Determining that the food is too hot may include a threshold range with respect to the particular temperature. For example, an embodiment may identify the food item as not too hot if it is within 3° of the temperature provided by the user. The threshold range may vary depending on the user (e.g., one user has programmed a narrower range as compared to a different user, etc.), the characteristic being identified (e.g., the range is higher for temperature but lower for radiation, etc.), the application being used (e.g., one application more accurately identifies the characteristic as compared to another application so the more accurate application range is larger, etc.), and the like.

One embodiment may determine when the characteristic will match the condition and provide a notification when the condition is met or has been calculated to have been met. For example, if a user has identified that they would like to drink a hot drink when it reaches a particular temperature an embodiment may determine the current temperature of the drink and the ambient temperature of the environment. Based upon this information an embodiment may calculate when the drink will reach the desired temperature and then provide an indication to the user that the condition has likely been met. This calculation or computation may be completed by a digital or virtual assistant. For example, the user may provide a request to the digital assistant to notify him/her when the drink reaches the desired temperature. The digital assistant may then compute when the desired temperature is likely and then notify the user when the desired temperature has likely been met.

The various embodiments described herein thus represent a technical improvement to conventional object characteristic techniques. The systems and methods as described herein provide a technique for providing an indication of characteristics of an object to a user. The systems and methods as described herein take a condition and provide an identification of a characteristic corresponding to the condition. This allows a user to interact with objects in a more efficient manner and in a manner that reduces injuries that could be caused by the user interacting with objects. Additionally, the systems and methods as described herein allow an integration between a digital assistant and sensors of an information handling device that can provide an indication to a user when a characteristic of the object matches or meets the desired condition.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
receiving, at an information handling device, object data for at least one object;
determining, based on the object data, an identity of the at least one object, wherein the determining the identity comprises comparing the object data to a stored data database, wherein the stored data database identifies typical characteristics of each of a plurality of objects;
identifying, using at least one sensor and based on the identity of the at least one object, a characteristic corresponding to the at least one object, wherein the identified characteristic is correlated to a typical value of the characteristic corresponding to the value of the characteristic when the at least one object is not in use, wherein the characteristic selected to be identified is selected at least in part based upon the at least one sensor used to identify the characteristic;
identifying, from the identified characteristic in view of the typical characteristic, a condition of the at least one object, the condition being identified from a present value of the characteristic as compared to the typical characteristic;
providing an indication of the condition of the at least one object to a user, wherein the providing comprises providing at least a visual indication comprising overlaying an image over the at least one object;
receiving, from the user and at the information handling device, an indication of a desired condition for the at least one object, the desired condition being different than the present condition and having a different value for the characteristic for the at least one object than the identified characteristic; and
providing a notification when one of: the at least one object and one of a plurality of objects matches the desired condition, wherein identifying the at least one object matches the desired condition comprises monitoring the condition of the at least one object, wherein identifying the one of a plurality of object matches the desired condition comprises comparing conditions of each of the plurality of objects to the desired condition.

2. The method of claim 1, wherein the receiving object data comprises receiving at least one image comprising the at least one object.

3. The method of claim 1, wherein the receiving object data comprises receiving a signal associated with the at least one object.

4. The method of claim 1, wherein the overlaying comprises overlaying, on a display device, the image on an image of the at least one object.

5. The method of claim 1, wherein the providing an indication comprises providing an audible output associated with the identified characteristic.

6. The method of claim 1, wherein the providing an indication comprises identifying an object from a plurality of objects matching the condition.

7. The method of claim 1, wherein the providing an indication comprises alerting the user that the characteristic is outside a predetermined threshold with respect to the condition.

8. The method of claim 1, further comprising determining when the characteristic will match the condition.

9. The method of claim 8, further comprising providing a notification to the user when the characteristic matches the condition.

10. The method of claim 1, wherein the information handling device comprises at least one of: a mobile device, a virtual reality headset, and an augmented reality headset.

11. An information handling device, comprising:
a processor;
at least one sensor operatively coupled to the processor;
a memory device that stores instructions executable by the processor to:
receive object data for at least one object;
determine, based on the object data, an identity of the at least one object, wherein the determining the identity comprises comparing the object data to a stored data database, wherein the stored data database identifies typical characteristics of each of a plurality of objects;
identify, using the at least one sensor and based on the identity of the at least one object, a characteristic corresponding to the at least one object, wherein the identified characteristic is correlated to a typical value of the characteristic corresponding to the value of the characteristic when the at least one object is not in use, wherein the characteristic selected to be identified is selected at least in part based upon the at least one sensor used to identify the characteristic;
identify, from the identified characteristic in view of the typical-characteristic, a condition of the at least one object, the condition being identified from a present value of the characteristic as compared to the typical characteristic;
provide an indication of the condition of the at least one object to a user, wherein the providing comprises providing at least a visual indication comprising overlaying an image over the at least one object;
receive, from the user and at the information handling device, an indication of a desired condition for the at least one object, the desired condition being different than the present condition and having a different value for the characteristic for the at least one object than the identified characteristic; and
provide a notification when one of: the at least one object and one of a plurality of objects matches the desired condition, wherein identifying the at least one object matches the desired condition comprises monitoring the condition of the at least one object, wherein identifying the one of a plurality of object matches the desired condition comprises comparing conditions of each of the plurality of objects to the desired condition.

12. The information handling device of claim 11, wherein the instructions executable by the processor to receive object data comprise instructions executable by the processor to receive at least one image comprising the at least one object.

13. The information handling device of claim 11, wherein the instructions executable by the processor to receive object data comprise instructions executable by the processor to receive a signal associated with the at least one object.

14. The information handling device of claim 11, wherein the overlaying comprises overlaying, on a display device, the image on an image of the at least one object.

15. The information handling device of claim 11, wherein the instructions executable by the processor to provide an indication comprise instructions executable by the processor to provide an audible output associated with the identified characteristic.

16. The information handling device of claim 11, wherein the instructions executable by the processor to provide an indication comprise instructions executable by the processor to identify an object from a plurality of objects matching the condition.

17. The information handling device of claim 11, wherein the instructions executable by the processor to provide an indication comprise instructions executable by the processor to alert the user that the characteristic is outside a predetermined threshold with respect to the condition.

18. The information handling device of claim 11, wherein the instructions are further executable by the processor to determine when the characteristic will match the condition.

19. The information handling device of claim 18, wherein the instructions are further executable by the processor to provide a notification to the user when the characteristic matches the condition.

20. A product, comprising:
a storage device that stores code, the code being executable by a processor and comprising:
code that receives object data for at least one object;
code that determines, based on object data, an identity of the at least one object, wherein the code that determines the identity comprises code that compares the object data to a stored data database, wherein the stored data database identifies typical characteristics of each of a plurality of objects;
code that identifies, using at least one sensor and based on the identity of the at least one object, a characteristic corresponding to the at least one object, wherein the identified characteristic is correlated to a typical value of the characteristic corresponding to the value of the characteristic-when the at least one object is not in use, wherein the characteristic selected to be identified is selected at least in part based upon the at least one sensor used to identify the characteristic;
code that identifies, from the identified characteristic in view of the typical characteristic, a condition of the at least one object, the condition being identified from a present value of the characteristic as compared to the typical characteristic; and
code that provides an indication of the condition of the at least one object to a user, wherein the providing comprises providing at least a visual indication comprising overlaying an image over the at least one object;
code that receives, from the user and at the information handling device, an indication of a desired condition for the at least one object, the desired condition being different than the present condition and having a different value for the characteristic for the at least one object than the identified characteristic; and code that provides a notification when one of: the at least one object and one of a plurality of objects matches the desired condition, wherein identifying the at least one object matches the desired condition comprises monitoring the condition of the at least one object, wherein identifying the one of a plurality of object matches the desired condition comprises comparing conditions of each of the plurality of objects to the desired condition.

\* \* \* \* \*